A method and an apparatus to perform multiple packet payload analysis have been disclosed. In one embodiment, the method includes receiving a plurality of data packets, each of the plurality of data packets containing a portion of a data pattern, determining whether each of the plurality of data packets is out of order, and making and storing a local copy of the corresponding data packet if the corresponding data packet is out of order. Other embodiments have been claimed and described.

United States Patent
Dubrovsky et al.

(10) Patent No.: US 10,021,122 B2
(45) Date of Patent: Jul. 10, 2018

(54) METHOD AND AN APPARATUS TO PERFORM MULTIPLE PACKET PAYLOADS ANALYSIS

(71) Applicant: SonicWALL US Holdings Inc., Santa Clara, CA (US)

(72) Inventors: Aleksandr Dubrovsky, San Mateo, CA (US); Roman Yanovsky, Los Altos, CA (US); Scott Aaron More, San Francisco, CA (US); Boris Yanovsky, Saratoga, CA (US)

(73) Assignee: SonicWALL Inc., Santa Clara, CA (US)

( * ) Notice: Subject to any disclaimer, the term of this patent is extended or adjusted under 35 U.S.C. 154(b) by 0 days.

(21) Appl. No.: 15/414,321

(22) Filed: Jan. 24, 2017

(65) Prior Publication Data

US 2017/0134409 A1    May 11, 2017

Related U.S. Application Data

(63) Continuation of application No. 14/818,215, filed on Aug. 4, 2015, now Pat. No. 9,553,883, which is a continuation of application No. 14/071,146, filed on Nov. 4, 2013, now Pat. No. 9,100,427, which is a continuation of application No. 13/491,484, filed on Jun. 7, 2012, now Pat. No. 8,578,489, which is a continuation of application No. 12/547,860, filed on
(Continued)

(51) Int. Cl.
*H04L 29/06*    (2006.01)
(52) U.S. Cl.
CPC ...... *H04L 63/1416* (2013.01); *H04L 63/0254* (2013.01); *H04L 69/22* (2013.01)

(58) Field of Classification Search
CPC .. H04L 63/1416; H04L 63/0254; H04L 69/22
USPC .......................................................... 726/23
See application file for complete search history.

(56) References Cited

U.S. PATENT DOCUMENTS

| | | | | |
|---|---|---|---|---|
| 5,414,833 A | * | 5/1995 | Hershey | G06F 21/564 713/164 |
| 5,796,942 A | * | 8/1998 | Esbensen | H04L 43/00 709/229 |

(Continued)

FOREIGN PATENT DOCUMENTS

| | | |
|---|---|---|
| EP | 1 122 932 | 8/2001 |
| EP | 1 528 743 | 5/2005 |
| WO | WO 97/39399 | 10/1997 |

OTHER PUBLICATIONS

Aggarwal, N., "Improving the Efficiency of Network Intrusion Detection Systems", Indian Institute of Technology, May 3, 2006, pp. 1-40.
(Continued)

*Primary Examiner* — Michael S McNally
(74) *Attorney, Agent, or Firm* — Polsinelli LLP

(57) ABSTRACT

A method and an apparatus to perform multiple packet payload analysis have been disclosed. In one embodiment, the method includes receiving a plurality of data packets, each of the plurality of data packets containing a portion of a data pattern, determining whether each of the plurality of data packets is out of order, and making and storing a local copy of the corresponding data packet if the corresponding data packet is out of order. Other embodiments have been claimed and described.

17 Claims, 6 Drawing Sheets

Related U.S. Application Data

Aug. 26, 2009, now Pat. No. 8,321,939, which is a continuation of application No. 10/964,871, filed on Oct. 13, 2004, now Pat. No. 7,600,257.

(56) References Cited

U.S. PATENT DOCUMENTS

| | | | |
|---|---|---|---|
| 5,945,933 A | 8/1999 | Kalkstein | |
| 6,088,803 A | 7/2000 | Tso et al. | |
| 6,108,782 A * | 8/2000 | Fletcher | G06F 8/65 370/245 |
| 6,119,236 A | 9/2000 | Shipley | |
| 6,178,448 B1 | 1/2001 | Gray et al. | |
| 6,219,706 B1 | 4/2001 | Fan et al. | |
| 6,449,723 B1 | 9/2002 | Elgressy et al. | |
| 6,851,061 B1 * | 2/2005 | Holland | H04L 63/1408 709/224 |
| 7,058,821 B1 * | 6/2006 | Parekh | H04L 63/145 713/194 |
| 7,134,143 B2 * | 11/2006 | Stellenberg | H04L 63/0263 382/159 |
| 7,152,164 B1 | 12/2006 | Loukas | |
| 7,185,368 B2 * | 2/2007 | Copeland | G06F 21/552 705/51 |
| 7,304,996 B1 | 12/2007 | Swenson et al. | |
| 7,600,257 B2 | 10/2009 | Dubrovsky | |
| 7,835,361 B1 | 11/2010 | Dubrovsky | |
| 7,849,502 B1 | 12/2010 | Bloch et al. | |
| 8,272,057 B1 | 9/2012 | Dubrovsky | |
| 8,321,939 B1 | 11/2012 | Dubrovsky | |
| 8,578,489 B1 | 11/2013 | Dubrovsky | |
| 8,584,238 B1 | 11/2013 | Dubrovsky | |
| 9,065,848 B2 | 6/2015 | Dubrovsky | |
| 9,100,427 B2 | 8/2015 | Dubrovsky | |
| 9,553,883 B2 | 1/2017 | Dubrovsky | |
| 2002/0083331 A1 | 6/2002 | Krumel | |
| 2003/0018914 A1 * | 1/2003 | Cheng | H04L 63/0254 726/13 |
| 2003/0028666 A1 * | 2/2003 | Hanner | H04L 49/90 709/238 |
| 2003/0084328 A1 * | 5/2003 | Tarquini | G06F 21/552 726/23 |
| 2003/0110208 A1 * | 6/2003 | Wyschogrod | G06F 17/30985 709/202 |
| 2003/0145228 A1 | 7/2003 | Suuronen et al. | |
| 2003/0154399 A1 * | 8/2003 | Zuk | H04L 63/0254 726/11 |
| 2004/0049596 A1 * | 3/2004 | Schuehler | H04L 43/18 709/238 |
| 2004/0093513 A1 | 5/2004 | Cantrell et al. | |
| 2004/0098617 A1 * | 5/2004 | Sekar | H04L 43/00 726/4 |
| 2004/0123155 A1 * | 6/2004 | Etoh | H04L 63/1408 726/23 |
| 2004/0199790 A1 * | 10/2004 | Lingafelt | H04L 63/1408 726/4 |
| 2004/0255163 A1 * | 12/2004 | Swimmer | G06F 21/552 726/24 |
| 2005/0050362 A1 | 3/2005 | Peles | |
| 2005/0091514 A1 * | 4/2005 | Fukumoto | H04L 63/1408 713/188 |
| 2005/0120243 A1 * | 6/2005 | Palmer, Jr. | H04L 63/1441 726/4 |
| 2005/0135380 A1 | 6/2005 | Sahita et al. | |
| 2005/0187916 A1 | 8/2005 | Levin et al. | |
| 2005/0216770 A1 * | 9/2005 | Rowett | H04L 63/101 726/5 |
| 2005/0229246 A1 * | 10/2005 | Rajagopal | H04L 63/0236 726/14 |
| 2005/0262556 A1 | 11/2005 | Waisman et al. | |
| 2006/0020595 A1 * | 1/2006 | Norton | G06F 17/30985 |
| 2006/0069787 A1 | 3/2006 | Sinclair | |
| 2006/0077979 A1 | 4/2006 | Dubrovsky et al. | |
| 2007/0058551 A1 * | 3/2007 | Brusotti | H04L 43/00 370/241 |
| 2008/0034073 A1 | 2/2008 | McCloy et al. | |
| 2008/0126794 A1 | 5/2008 | Wang et al. | |
| 2008/0235755 A1 | 9/2008 | Blaisdell et al. | |
| 2009/0271613 A1 | 10/2009 | Brabson | |
| 2014/0053264 A1 | 2/2014 | Dubrovsky | |
| 2014/0059681 A1 | 2/2014 | Dubrovsky | |
| 2015/0295894 A1 | 10/2015 | Dubrovsky | |
| 2015/0350231 A1 | 12/2015 | Dubrovsky | |
| 2017/0163604 A1 | 6/2017 | Dubrovsky | |

OTHER PUBLICATIONS

Bellovin, S., "Firewall-Friendly FTP," Network Working Group, RFC No. 1579, AT&T Bell Laboratories, Feb. 1994, http://www.iettorg/rfc1579.txt?number=1579, downloaded Jul. 15, 2002, 4 pages.

Blyth, "Detecting Intrusion", School of Computing, University of Glamorgan, 14 pages. 2005.

Branch, Joel; Bivens, Alan; Chan, Chi Yu; Lee, Taek Kyeun; and Szymanski, Boleslaw, "Denial of Service Intrusion Detection Using Time Dependent Deterministic Finite Automania", Oct. 17. 2002, RPI Graduate research Conference 2002.

Gateway Anti-Virus, Anti-Spyware and Intrusion Prevention Service, Unified Threat Management, Intelligent Real-time Protection, © 2005, 2 pp.

Giles et al., C., "Learning a Class of Large Finite State Machines With a Recurrent Neural Network", Neural Networks, vol. 8, No. 9, pp. 1359-1365, 1995.

Holzmann et al., G., "A Minimized Automation Representation of Reachable States", Int J. STTT 2, pp. 270-278, 1999.

Kruegal, Christopher; and Toth, Thomas, "Using decision trees to improve signature-based intrusion detection," Sep. 8, 2003, RAID 2003: recent Advance in Intrusion Detection. 20 Pages.

Juniper Networks:: Attack Detection, www.juniper.net/products/intrusion/detection.html, 7 pages.

Juniper Networks:: Attack Detection and Prevention, www.juniper.net/products/intrusion/ 2 pages.

Juniper Networks:: Attack Prevention, www.juniper.net/products/intrusion/prevention.html, downloaded Jun. 11, 2004, 2 pages.

Juniper Networks:: Architecture, www.juniper.net/products/intrusion/architecture.html, 3 pages.

Juniper Networks:: Juniper Networks NetScreen-IDP 10/100/500/1000, Intrusion Detection and Prevention, Spec Sheet, Apr. 2004, 2 pages.

Lucas, Simon M., "Learning Deterministic Finite Automata with a Smart State Labeling Evolutionary Algorithm," IEEE Transaction on Pattern Analysis and Machine Intelligence, vol. 27, No. 7, Jul. 2005, pp. 1063-1074.

Roberts, Paul, "NetScreen announced deep inspection firewall," www.newfusion.com/news/2003/1020newscannou.html, 5 pages.

Roesch, Martin and Green, Chris, "Snort Users Manual," Snort Release 2.0.0, M. Roesch, C. Green Copyright 1998-2003 M. Roesch, Copyright 2001-2003 C.Green, Copyright 2003 Sourcefire, Inc. dated Dec. 8, 2003 (53 pgs).

"SonicWALL Complete Anti-Virus, Automated and Enforced Anti-Virus Protection," © 2005, 2 pp.

"SonicWALL Content Filtering Service," Comprehensive Internet Security™, © 2005, 2 pp.

"SonicWALL Content Security Manager Series, Easy-to-use, Affordable, Content Security and Internet Threat Protection," © 2006, Dec. 2006, 4 pp.

"SoniceWALL Endpoint Security: Anti-Virus, Automated and Enforced Anti-Virus and Anti-Virus and Anti-Spyware Protection," © 2007, Mar. 2007, 2 pp.

SonicWALL Internet Security Appliances, "Content Security Manager Integrated Solutions Guide", Version 3.0, © 2007, 160 pp.

SonicWALL Internet Security Appliances, "SonicOS 3.8 Standard Administrator's Guide", © 2007, 362 pp.

"SonicOS Standard 3.8.0.2 Release Notes, SonicWALL Secure AntiVirus Router 80 Series," SonicWALL, Inc., Software Release: Apr. 11, 2007, 13 pp.

(56) References Cited

OTHER PUBLICATIONS

Snort.org, "The Open Source Network Intrusion Detection System", www.snort.org/about.html, 2 pages.
"The Ultimate Internet Sharing Solution, WinProxy, User Manual," Copyright 1996-2002 Osistis Software, Inc., dated Feb. 2002 (290 pgs).
Van Engelen, R., "Constructing Finite State Automata for High-Performance XML Web Services," International Symposium on Web Services and Applications, 2004, pp. 1-7.
Villa, Oreste. Feb. 2008. IBM Research Report: Too many words, too little time: Accelerating real-time keyword scanning with multi-core processors. Retrieved from http://domino.research.ibm.com/library/cyberdignsf/papers/9
EB4740B4B0739CF852573F5005A6311/$FileIrc24488.pdf. Retrieval data Mar. 5, 2012.
Taiwan Application No. 093133045, Search Report dated Aug. 5, 2011.
European Application No. EP 04 02 5579, Search Report dated May 23, 2005.
Taiwan Application No. 093133045, Office Action dated Sep. 8, 2011.
U.S. Appl. No. 10/964,871; Office Action dated Jan. 9, 2009.
U.S. Appl. No. 10/964,871; Office Action dated Jul. 16, 2008.
U.S. Appl. No. 10/964,871; Final Office Action dated Mar. 20, 2008.
U.S. Appl. No. 10/964,871; Office Action dated Oct. 2, 2007.
U.S. Appl. No. 11/112,252; Office Action dated Mar. 1, 2010.
U.S. Appl. No. 11/112,252; Final Office Action dated Oct. 19, 2009.
U.S. Appl. No. 11/112,252; Office Action dated Mar. 31, 2009.
U.S. Appl. No. 11/112,252; Final Office Action dated Nov. 14, 2008.
U.S. Appl. No. 11/112,252; Office Action dated Apr. 29, 2008.
U.S. Appl. No. 12/547,860; Final Office Action dated Sep. 26, 2011.
U.S. Appl. No. 12/547,860; Office Action dated May 3, 2011.
U.S. Appl. No. 12/547,860; Final Office Action dated Dec. 10, 2010.
U.S. Appl. No. 12/547,860; Office Action dated Aug. 31, 2010.
U.S. Appl. No. 13/491,484; Office Action dated May 9, 2013.
U.S. Appl. No. 14/071,146; Final Office Action dated Dec. 19, 2014.
U.S. Appl. No. 14/071,146; Office Action dated Aug. 15, 2014.
U.S. Appl. No. 12/913,668; Final Office Action dated Nov. 2, 2011.
U.S. Appl. No. 12/913,668; Office Action dated Jun. 24, 2011.
U.S. Appl. No. 13/587,748; Office Action dated May 14, 2013.
U.S. Appl. No. 14/064,597; Final Office Action dated Dec. 10, 2014.
U.S. Appl. No. 14/064,597; Office Action dated Aug. 14, 2014.
U.S. Appl. No. 14/747,860; Office Action dated May 11, 2016.
U.S. Appl. No. 15/435,917, Aleksandr Dubrovsky, Method and an Apparatus to Perform Multiple Packet Payloads Analysis, filed Feb. 17, 2017.
U.S. Appl. No. 15/435,917; Office Action dated Sep. 7, 2017.

\* cited by examiner

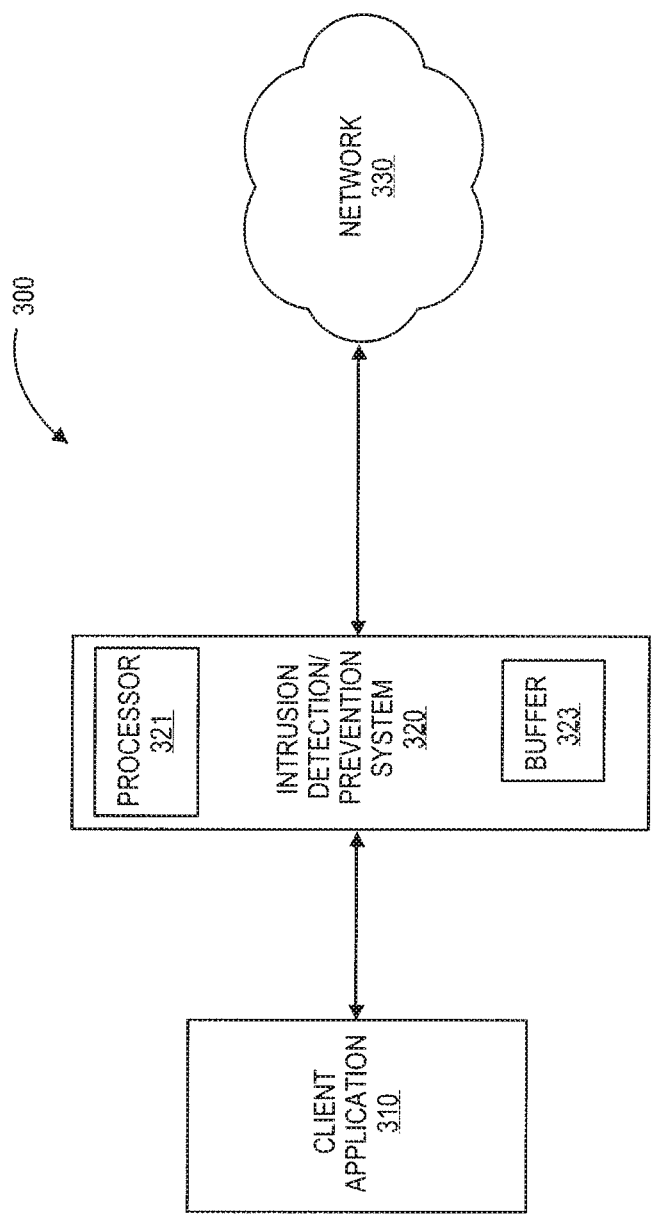

METHOD AND AN APPARATUS TO PERFORM MULTIPLE PACKET PAYLOADS ANALYSIS

CROSS-REFERENCE TO RELATED APPLICATIONS

The present application is a continuation and claims the priority benefit of U.S. patent application Ser. No. 14/818, 215 filed Aug. 4, 2015, now U.S. Pat. No. 9,553,883, which issued on Jan. 24, 2017, which is a continuation and claims the priority benefit of U.S. patent application Ser. No. 14/071,146 filed on Nov. 4, 2013, now U.S. Pat. No. 9,100,427, which issued on Aug. 4, 2015, which is a continuation and claims the priority benefit of U.S. patent application Ser. No. 13/491,484 filed Jun. 7, 2012, now U.S. Pat. No. 8,578,489, which issued on Nov. 5, 2013, which is a continuation and claims the priority benefit of U.S. patent application Ser. No. 12/547,860 filed Aug. 26, 2009, now U.S. Pat. No. 8,321,939, which issued on Nov. 27, 2012, which is a continuation and claims the priority benefit of U.S. patent application Ser. No. 10/964,871 filed Oct. 13, 2004, now U.S. Pat. No. 7,600,257, which issued on Oct. 6, 2009, the disclosures of which are incorporated herein by reference.

BACKGROUND OF THE INVENTION

Field of the Invention

The present invention relates to intrusion detection and prevention in a networked system, and more particularly, to performing multiple packet payloads analysis.

Description of the Related Art

Today, in many security products, pattern matching is used to prevent many types of security attacks. For example, some existing desktop virus scanning may include scanning files against certain recognizable patterns. These files usually come from mail attachments and website downloads. These desktop applications are simpler in that by the time the pattern matching is performed, the input has been all accumulated in the correct order. The situation is more complicated for gateway products, such as firewalls, attempting to match patterns for other purposes, such as deep packet inspection. Some of these products scan for patterns over Transport Control Protocol (TCP) packets. Since TCP usually breaks down application data into chunks called TCP segments, the full pattern may reside in several TCP segments. One conventional approach is to reassemble all TCP packets together into one large chunk and perform pattern matching on this chunk, similar to scanning files. The disadvantage of this approach is that this approach requires processing to reassemble, and it further requires memory to store the intermediate result before pattern matching can take place.

To further complicate the problem, many security attacks exhibit more than one pattern, and thus, multiple pattern matching has to be performed in order to successfully screen out these attacks. Such a collection of patterns is called a signature. For example, an attack signature may contain a recognizable header and a particular phrase in the body. To detect such an attack, the detection mechanism has to match all the patterns in the signature. If only part of the signature is matched, false positives may occur. As such, the term "attack pattern" is used to refer to a single pattern or a signature.

When such attacks are transported over TCP, the contents, and therefore the recognizable patterns, may exist in different TCP segments. In fact, even a single pattern is more often split over several segments. Therefore, two problems have to be solved at the same time. On one hand, the detection mechanism has to scan each pattern across multiple segments, and on the other hand, the detection mechanism also has to scan across patterns. One existing approach is to reassemble all packets and scan for each pattern in sequence. This approach is inefficient in terms of processing time and memory usage because scanning cannot start until all packets are received and reassembled and extra memory is needed to store the packets received.

Another major problem in pattern matching is that the packets may arrive out of order. Again, using TCP as an example, the application data is broken into what TCP considers the best sized chunks to send, called a TCP segment or a TCP segment. When TCP sends a segment, it maintains a timer and waits for the other end to acknowledge the receipt of the segment. The acknowledgement is commonly called an ACK. If an ACK is not received for a particular segment within a predetermined period of time, the segment is retransmitted. Since the IP layer transmits the TCP segments as IP datagrams and the IP datagrams can arrive out of order, the TCP segments can arrive out of order as well. Currently, one receiver of the TCP segments reassembles the data if necessary, and therefore, the application layer receives data in the correct order.

An existing Intrusion Detection/Prevention System (IPS) typically resides between the two ends of TCP communication, inspecting the packets as the packets arrive at the IPS. The IPS looks for predetermined patterns in the payloads of the packets. These patterns are typically application layer patterns. For example, the pattern might be to look for the word "windows". However, the word may be broken into two TCP segments, e.g., "win" in one segment and "dows" in another segment. If these two segments arrive in the correct order, then IPS can detect the word. However, if the segments arrive out of order, which happens relatively often, then the IPS may first receive the segment containing "dows", and have to hold this segment and wait for the other segment. A typical approach is for the IPS to force the sender to re-transmit all the segments from the last missing one, hoping that the segments may arrive in order the second time. One disadvantage of this approach is the additional traffic in between and the additional processing on both ends of the TCP communication.

SUMMARY OF THE PRESENTLY CLAIMED INVENTION

The present invention includes a method and an apparatus to perform multiple packet payloads analysis. In one embodiment, the method includes receiving a plurality of data packets, each of the plurality of data packets containing a portion of a data pattern, determining whether each of the plurality of data packets is out of order, and making and storing a local copy of the corresponding data packet if the corresponding data packet is out of order.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 3 illustrates a system usable with one embodiment of the invention.

DETAILED DESCRIPTION

A method and an apparatus to perform multiple packet payloads analysis are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1A:
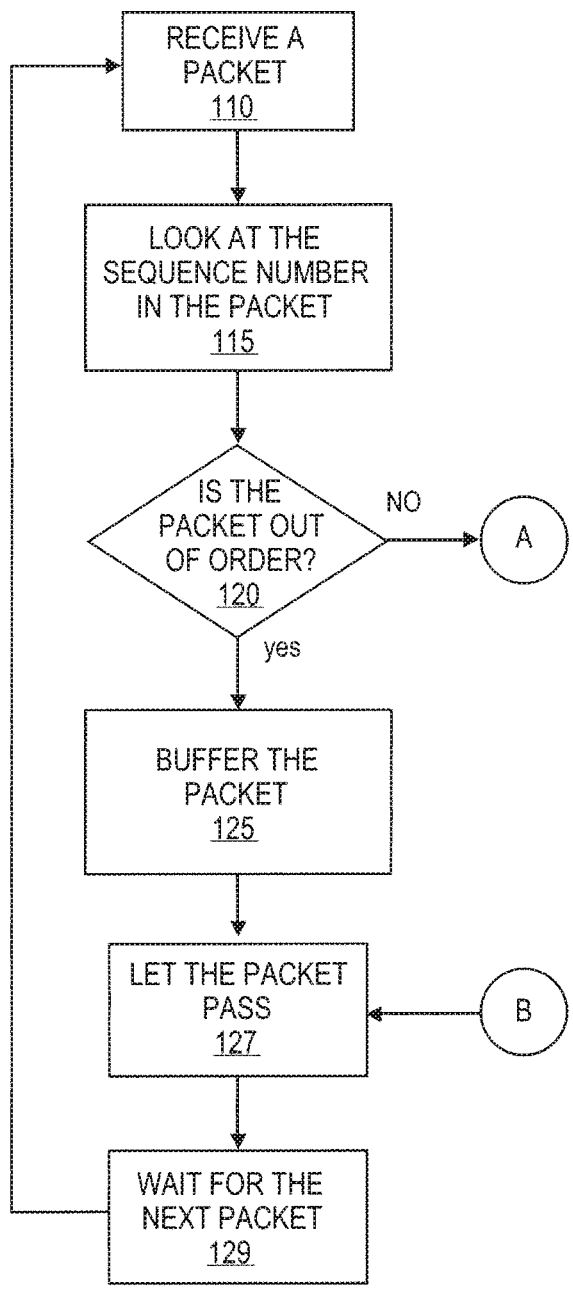
FIGS. 1A and 1B illustrate flow diagrams of one embodiment of a process to perform multiple packet payloads analysis.
Figure 1B:
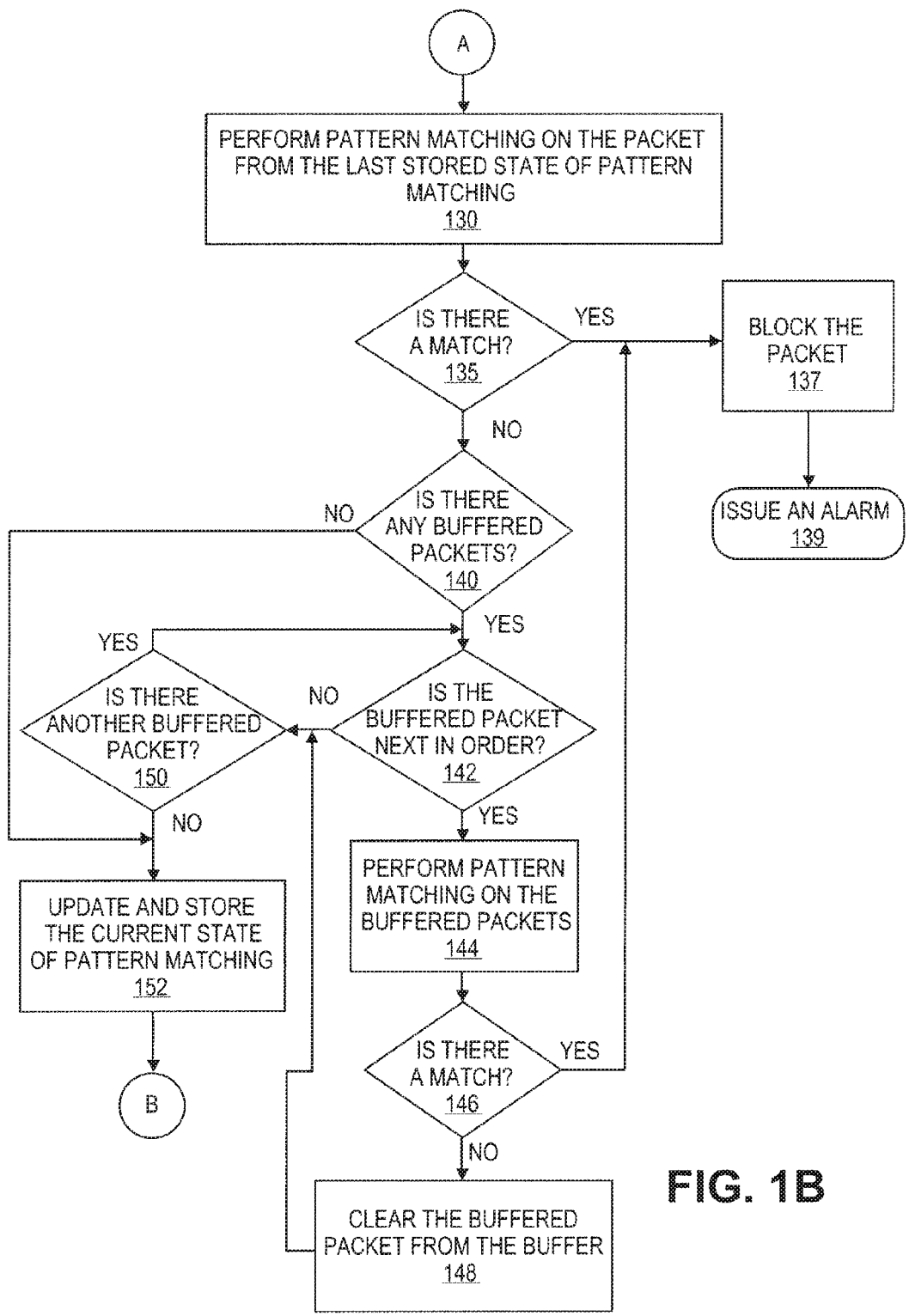

FIGS. 1A and 1B shows flow diagrams of one embodiment of a process to perform multiple packet payload analysis in an intrusion detection/prevention system (IPS). In the following discussion, "data packet" and "packet" are used interchangeably. Examples of a packet include a TCP packet. The process is performed by processing logic that may comprise hardware (e.g., circuitry, dedicated logic, etc.), software (such as is run on a general-purpose computer system, a server, a router, or a dedicated machine), or a combination of both.

Referring to FIG. 1A, processing logic receives a packet (processing block 110). Then processing logic checks the sequence number in the packet (processing block 115) and determines whether the packet is out of order (processing block 120). If the packet is out of order, processing logic buffers the packet (processing block 125) and allows the packet to pass. In some embodiments, processing logic makes a copy of the out-of-order packet and temporarily stores the copy in a storage device, such as a cache. Then processing logic waits for the next packet to arrive (processing block 129).

Referring to FIG. 1B, if the packet is not out of order, processing logic performs pattern matching on the packet from the last stored state of the pattern matching (processing block 130). In some embodiments, processing logic performs pattern matching using one Deterministic Finite Automaton (DFA) for each predetermined pattern. Detail on pattern matching using a DFA is described below with reference to FIG. 2A. Furthermore, processing logic may have been set up to perform multiple pattern matching in order to scan for a signature. To perform multiple pattern matching, processing logic may use a logical pointer to point at the pattern that is currently being matched.

Referring back to FIG. 1B, processing logic then determines whether the in order packets received so far match a predetermined attack pattern (i.e., a pattern or a signature) (processing block 135). If there is a match, processing logic blocks the packet (processing block 137) and issues an alarm (processing block 139). If there is no match, processing logic checks whether there is any buffered packets in the IPS (processing block 140). If there is no buffered packets in the IPS, then processing logic updates and stores the current state of the pattern matching performed so far (processing block 152). Then processing logic transitions to processing block 127.

If there is at least one buffered packet in the IPS, then processing logic checks whether the buffered packet is next in order (processing block 142). Processing logic may check the sequence number in the buffered packet to determine whether the buffered packet is next in order. If the buffered packet is not next in order, then processing logic checks whether there is another buffered packet in the IPS (processing block 150). If there is no more buffered packet in the IPS, then processing logic transitions to processing block 152. Otherwise, processing logic returns to processing block 142 to check whether the other buffered packet is next in order.

If the buffered packet is next in order, processing logic transitions from processing block 142 to processing block 144 to perform pattern matching on the buffered packet. Then processing logic determines whether the packets compared so far contain a pattern matching the predetermined attack pattern (processing block 146). If there is a match, processing logic transitions to processing block 137 to block the packet. Processing logic then issues an alarm (processing block 139).

If there is no match, then processing logic clears this buffered packet from the buffer (processing block 148). Then processing logic transitions to processing block 150 to check whether there is any more buffered packet. If there is at least one more buffered packet, then processing logic repeats processing blocks 142. Otherwise, processing logic updates and stores the current state of the pattern matching (processing block 152) and then allows the current packet to pass (processing block 127). Processing logic waits for the next packet (processing block 129) before repeating the above process for the next packet.

By holding back the last packet received until it is verified that all the in order packets received so far do not contain the predetermined pattern, processing logic may prevent harmful or hostile data patterns from passing through the IPS via multiple out-of-order packets. The packets containing the incomplete hostile data pattern that have been passed to an application layer cannot launch an attack on the system. Moreover, by copying the out-of-order packets and allowing these out-of-order packets to pass, processing logic does not intrude or interrupt the data traffic, and hence, provides protection against attacks reduces the overall latency in data traffic due to the IPS.

Figure 2A:
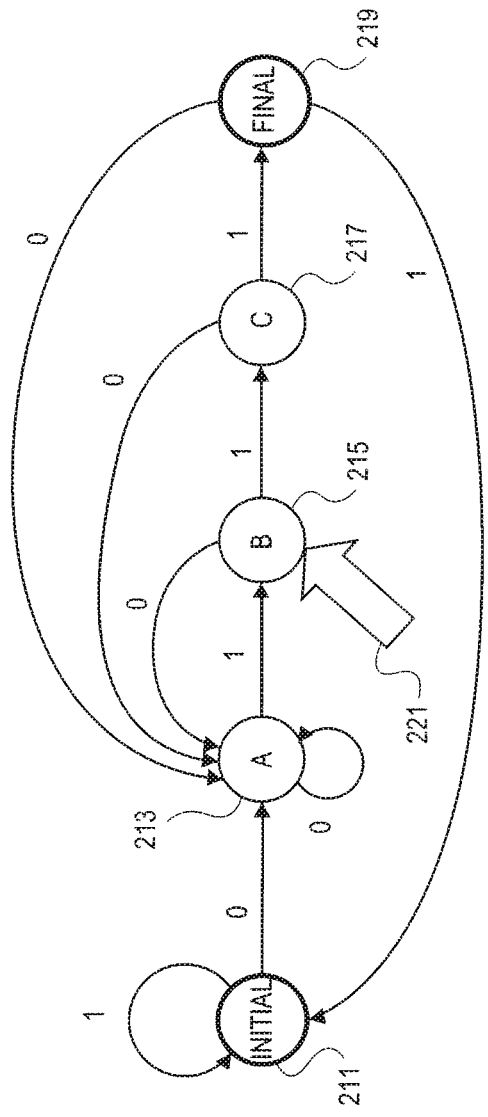
FIG. 2A illustrates an exemplary Deterministic Finite Automaton (DFA) according to one embodiment of the invention.

FIG. 2A illustrates an example of a DFA according to one embodiment of the invention. In this example, an IPS is programmed to detect and to prevent a pattern of "0111" to pass through. The DFA 200 shown in FIG. 2A corresponds to this pattern. Processing logic may use the DFA 200 to perform pattern matching on a number of packets to determine whether the packets contain the pattern "0111". Furthermore, to simplify the illustration, it is assumed in this example that each packet contains only one digit. However, it should be appreciated that the concept is applicable to scenarios where a packet contains more than one digits and/or alphabetic letters.

Referring to FIG. 2A, the DFA 200 includes 5 states 211-219. The states 211-219 in the DFA 200 may be referred to as nodes. Pattern matching begins at the initial state 211.

If a packet received contains a "1", processing logic remains in the initial state 211. If the packet contains a "0", which corresponds to the first digit in the predetermined pattern, processing logic transitions to the A state 213. If processing logic receives a "0" subsequently, processing logic remains in the A state 213. If processing logic receives a "1", which corresponds to the second digit in the predetermined pattern, then processing logic transitions into the B state 215.

From the B state 215, processing logic may transition back to the A state 213 if the next packet received contains a "0". If the next packet received contains a "1", which corresponds to the third digit in the predetermined pattern, then processing logic transitions to the C state 217.

From the C state 217, processing logic may transition back to the A state 213 if the next packet received contains a "0". If the next packet received contains a "1", which corresponds to the last digit in the predetermined pattern, then processing logic transitions to the final state 219. When processing logic reaches the final state 219, processing logic knows that the packets received so far contains the predetermined pattern. Hence, processing logic may perform the appropriate operations in response to receiving the predetermined pattern, such as block the packet of the predetermined pattern last received and issuing an alarm to alert system administrators. To keep track of which state of the DFA processing logic is in, processing logic may use a logical pointer to point to the current state of the DFA. For example, a logical pointer 221 in FIG. 2A points at state B 215 to indicate that state B 215 is the current state of the pattern matching.

One advantage of using the DFA to perform pattern matching on packets is to eliminate the need to reassemble the packets because processing logic can walk through the DFA as each packet is received and examined. If processing logic reaches a final state, there is a match between the pattern contained in the packets received so far and the predetermined pattern. As mentioned above, a pattern is typically broken up into a number of segments and each segment is transmitted using a packet. Using the DFA, processing logic may not have to reassemble the packets in order to find out what the pattern contained in the packets is in order to match the pattern against a predetermined pattern. Processing logic may perform pattern matching on a packet-by-packet basis as each of the packets is received without reassembling the packets. Therefore, processing logic does not have to store the packets for reassembling the packets. Instead, processing logic may simply store a pointer to keep track of the current state in the DFA.

The concept described above may be expanded to signature detection. A signature is a collection of multiple patterns. To keep track of which pattern within a signature is being matched, processing logic may use a tree structure, where each node within the tree structure corresponds to a pattern and each pattern is represented using a DFA. Alternatively, a single DFA may represent multiple patterns, an example of which is discussed below with reference to FIG. 2B. Processing logic may use a pointer to point at the node corresponding to the pattern that is currently being matched.

In some embodiments, multiple patterns in a signature are matched sequentially. That is, once a first pattern is matched, processing logic goes on to try to match a second pattern. However, processing logic may continue looking for the first pattern in the incoming data packets because the first pattern may repeat before the second pattern arrives. In some embodiments, processing logic has to take into consideration of additional rules besides matching individual patterns of a signature. For example, a first pattern may have to be at least x bytes away from the second pattern, where x is a predetermined number. Alternatively, two patterns of the signature may have to be separated from each other by y bytes or less, where y is a predetermined number.

Figure 2B:
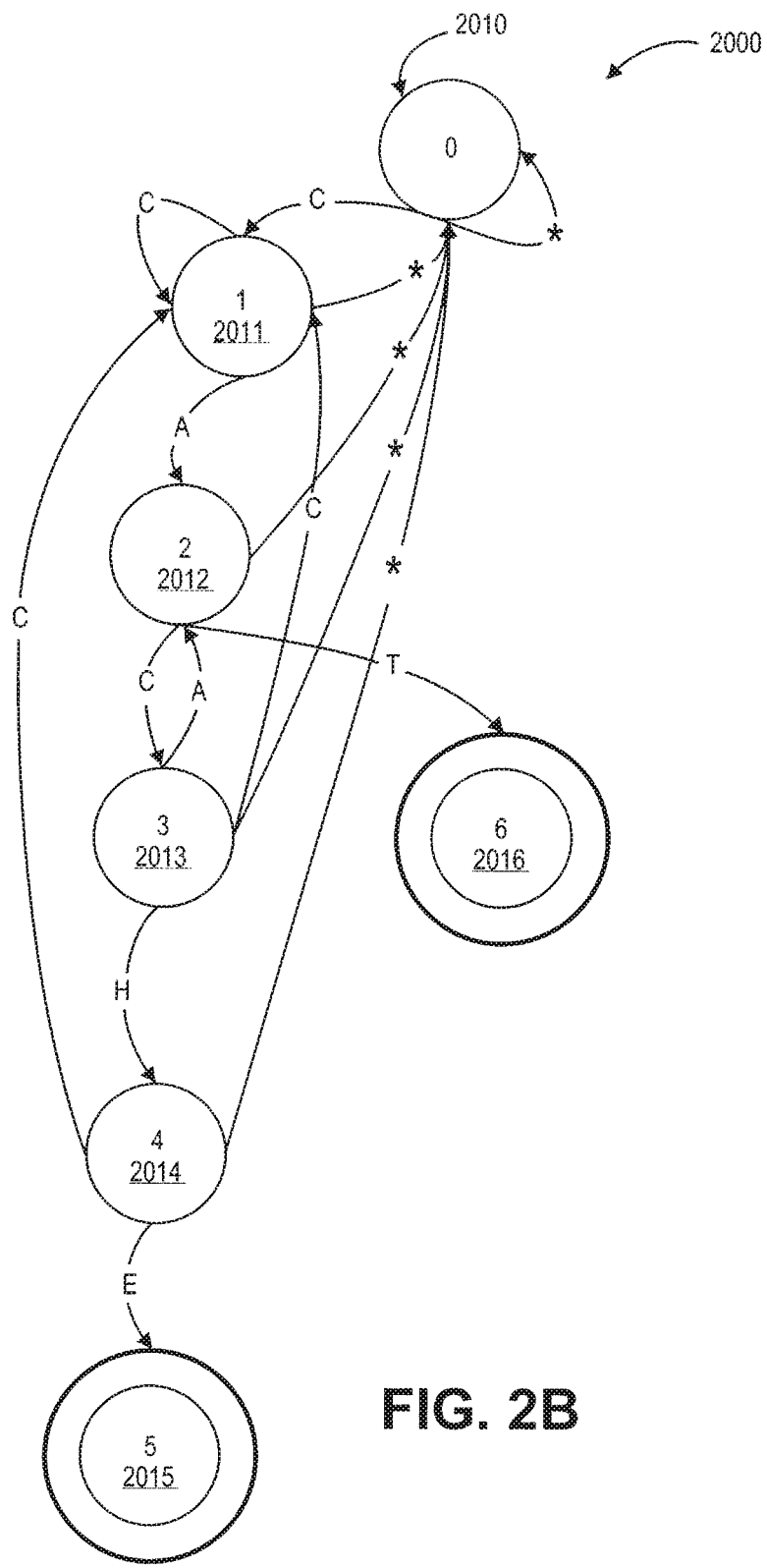
FIG. 2B illustrates an exemplary DFA representing two patterns according to one embodiment of the invention.

FIG. 2B illustrates an exemplary DFA 2000 representing two patterns according to one embodiment of the invention. In this example, an IPS is programmed to detect a pattern of "CAT" and a pattern of "CACHE." Both patterns may be part of a signature. To simplify the illustration, it is assumed in this example that each packet contains only one alphabetic letter. However, it should be appreciated that the concept is applicable to scenarios where a packet contains one or more alphabetic letters and/or one or more numeric digits.

The DFA 2000 includes six states 2010-2016. Pattern matching begins at the initial state 2010. If a packet received contains a "C," which is the first letter of both "CAT" and "CACHE," processing logic transitions to the state 2011. If the packet received contains any other alphabet, processing logic remains in the initial state 2010. From state 2011, if processing logic receives a "C," then processing logic remains in state 2011. If processing logic receives an "A," then processing logic transitions to state 2012. If processing logic receives any alphabet other than "A" or "C," processing logic returns to the initial state 2010.

From state 2012, if processing logic receives a "C," then processing logic transitions to state 2013 because "C" is the third letter in the pattern "CACHE." If processing logic receives a "T," then processing logic transitions to the final state 2016 because the pattern "CAT" is matched. If processing logic receives any alphabet other than "T" or "C," processing logic returns to the initial state 2010.

From state 2013, if processing logic receives a "C," then processing logic transitions back to state 2011. If processing logic receives an "H," then processing logic transitions to state 2014. If processing logic receives any alphabet other than "H" or "C," processing logic returns to the initial state 2010.

From state 2014, if processing logic receives a "C," then processing logic transitions back to state 2011. If processing logic receives an "E," then processing logic transitions to the final state 2015 because the pattern matches "CACHE." If processing logic receives any alphabet other than "E" or "C," processing logic returns to the initial state 2010.

As discussed above, when processing logic reaches a final state (e.g., state 2015 and state 2016), processing logic knows that the packets received so far contains at least one of the predetermined patterns. Hence, processing logic may perform the appropriate operations in response to receiving the predetermined pattern, such as blocking the packet of the predetermined pattern last received and issuing an alarm to alert system administrators.

Furthermore, to keep track of which state of the DFA 2000 processing logic is in, processing logic may use a logical pointer to point to the current state of the DFA 2000. An example of the logical pointer has been discussed above with reference to FIG. 2A.

Figure 2C:
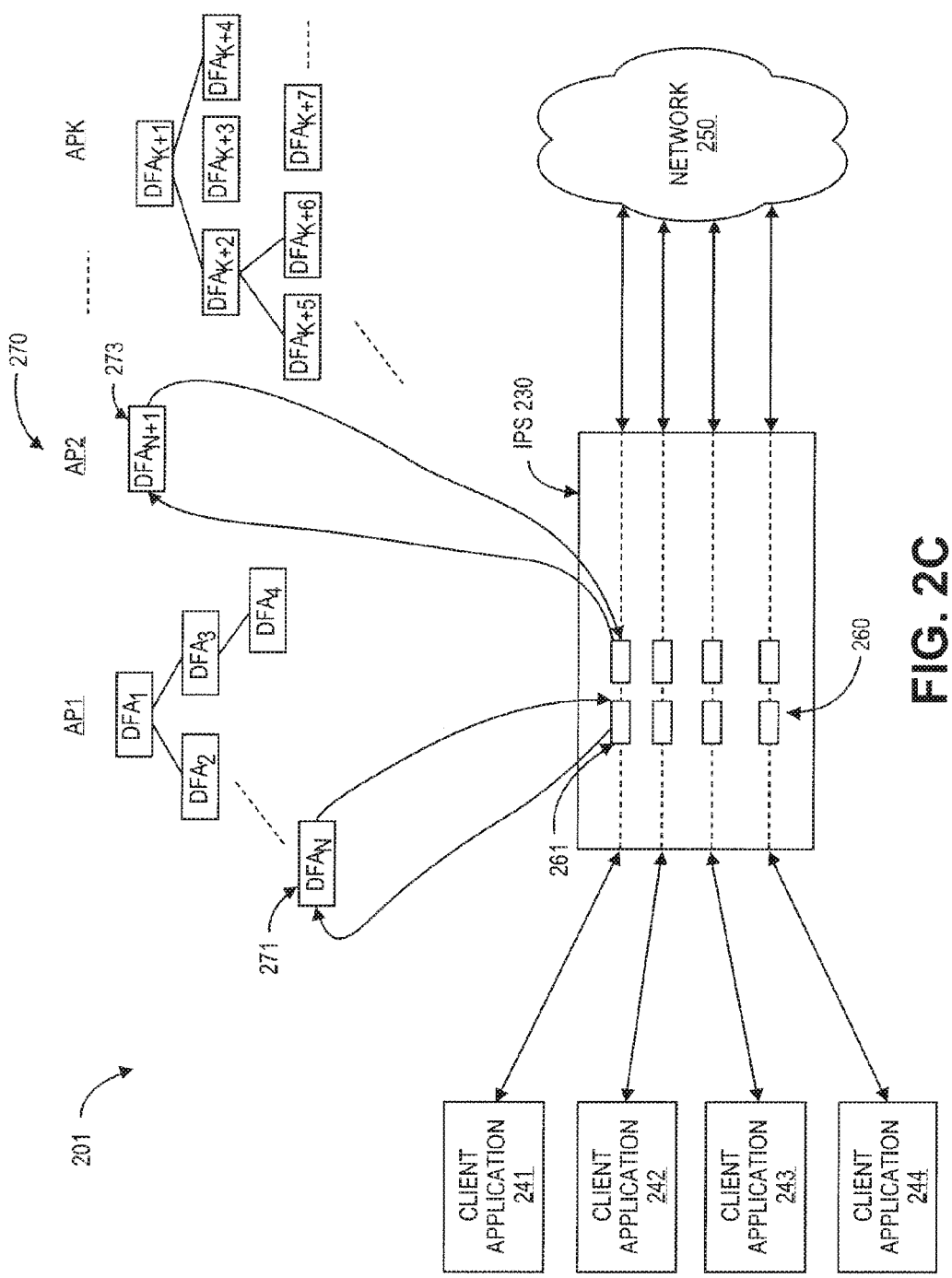
FIG. 2C illustrates one embodiment of a system usable with the invention.

FIG. 2C illustrates one embodiment of a system usable with the invention. The system 201 includes a network 250, an IPS 230, and a number of client applications 241-244. The client applications 241-244 may run on different client machines (e.g., a personal computer, a workstation, etc.) or two or more of the client applications 241-244 may run on a single client machine. Furthermore, the IPS 230 may run on one of the client machines or on a separate unit, such as a server, a router, or a switch.

In some embodiments, data packets 260 (e.g., TCP packets) are transmitted via the IPS 230 between the network 250 and the client applications 241-244. In order to detect multiple signatures in the packets passing through the IPS 230, the IPS 230 keeps track of which signature(s) is being matched for which TCP connection and which pattern within the corresponding signature is being matched. Referring to FIG. 2C, the IPS 230 is programmed to detect a number of attack patterns 270, such as AP1, AP2, APK, etc. Each of the attack patterns 270 may include one or more predetermined patterns. An attack pattern that includes multiple patterns (e.g., AP1, APK) may also be referred to as a signature. AP1 includes n patterns represented by DFA.sub.1 to DFA.sub.N. Upon a successful match of DFA.sub.1 of AP1 for a given client application, DFA.sub.2 of AP1 is started for that client application. Upon completing DFA.sub.N for AP1, an attack pattern is identified. Unlike AP1, AP2 includes a single pattern presented by DFA.sub.n+1. APK includes multiple patterns represented by DFA.sub.k, DFA.sub.k+1, etc. Note that the multiple patterns of an attack pattern may be represented by a tree structure, where each node of the tree structure corresponds to a pattern of the signature.

The IPS 230 may perform pattern matching on the packets 260 received. For example, consider the packet 261, which is destined to the client application 241. The IPS 230 performs pattern matching on the packet 261 to determine whether the packet 261 and the other packets received so far contain data matching the predetermined pattern corresponding to the DFA.sub.n 271. The IPS 230 may store a logical pointer 281 pointing at the DFA.sub.n 271 of Signature1 after performing pattern matching on the packet 261. In addition, processing logic may store another pointer to point at the current state in the corresponding DFA, i.e., DFA.sub.n 271, as described above with reference to FIG. 2A. This state tracking may be bidirectional (i.e., states may be kept on traffic in both directions between client applications 241-244 and the network 250).

The techniques discussed above may be implemented in various embodiments of a networked system. One exemplary embodiment is discussed below to illustrate the concept. However, one should appreciate that the invention is not limited to the configurations in the following embodiment. For example, the IPS 230 may run on a dedicated machine or on different devices within the system, such as a router, a switch, a server, etc.

FIG. 3 illustrates one embodiment of a system usable with the invention. The system 300 includes at least one client application 310, an IPS 320, and a network 330. The client application 310 is communicably coupled to the IPS 320. The IPS 320 is communicably coupled to the network 330. Data is transmitted between the network 330 and the client application 310 via the IPS 320 in packets. In one embodiment, the IPS includes a processor 321 and a buffer 323.

Note that any or all of the components and the associated hardware illustrated in FIG. 3 may be used in various embodiments of the system 300. However, it should be appreciated that other configurations of the system 300 may include more or less devices than those shown in FIG. 3.

In some embodiments, the processor 321 of the IPS 320 determines whether a packet received is out of order. The processor 321 may examine a sequence number in the packet to determine whether the packet received is out of order. If the packet is out of order, the processor 321 may make a copy of the packet and temporarily store the copy in the buffer 323 before allowing the packet to pass through the IPS 320. If the packet is in order, the processor 321 may perform pattern matching on the packet to determine whether the packet and the other packets received so far contain one of a number of predetermined patterns. Some of these predetermined patterns may be part of a signature. In order to keep track of which pattern is being matched, the processor 321 may use a logical pointer to keep track of the pattern that is currently being matched.

In one embodiment, the processor 321 uses a corresponding DFA to perform pattern matching against one of the predetermined patterns. The DFA may include a number of states corresponding to different parts of the predetermined pattern. When the final state in the DFA is reached, the processor 321 knows that the packets received so far contains the predetermined pattern. The processor 321 may use a pointer to keep track of the current state of the DFA. In addition, the processor 321 may use another pointer to keep track of which one of the predetermined patterns the processor 321 is matching. Detail of one embodiment of the process to perform multiple packet payload analysis in the IPS 320 is described above with reference to FIGS. 1A and 1B.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-accessible medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method for scanning packet payload data, the method comprising:
   receiving a plurality of different packet sets from a plurality of different client application programs over one or more data communication connections, wherein at least one of the data communication connections transports packets in accordance with a transfer control protocol (TCP), and wherein each set corresponds to at least one of the data communication connections;
   identifying that at least one packet associated with a first packet set is received out-of-order, wherein the out-of-order packet is associated with a first client application and a first communication connection;
   tracking an association between a predetermined attack pattern, the first packet set, and the first communication connection;
   storing the at least one packet of the first packet set in a buffer before transmitting to a destination;
   processing one or more other data packets associated with one or more other packet sets;
   receiving another packet associated with the first packet set;
   identifying that the other packet precedes the out-of-order packet within the first packet set;
   scanning the second packet before scanning the out-of-order packet;
   identifying that the first packet set includes the attack pattern based on scanning of the second packet and the out-of-order packet and the tracked association between the attack pattern, the first packet set, and the first communication connection; and
   blocking the data packets associated with the first packet set based on the identification that the first packet set includes the attack pattern.

2. The method of claim 1, further comprising identifying that the first packet set includes the attack pattern after a plurality of different data packets associated with the first packet set have been received.

3. The method of claim 1, wherein each of the data packets associated with the first packet set includes a sequence number.

4. The method of claim 1, wherein each of the data packets associated with one of the other packet sets includes a sequence number.

5. The method of claim 1, wherein the data packets associated with one of the other packet sets are transmitted over a different connection than the data packets associated with the first packet set.

6. The method of claim 1, wherein a set of multiple attack patterns that includes the predetermined attack pattern is associated with a signature, and wherein scanning comprises scanning for the set of attack patterns associated with the signature.

7. The method of claim 6, wherein scanning for the set of attack patterns associated with the signature comprises use of a pointer to point to a current pattern matching state that corresponds to the predetermined attack pattern.

8. A non-transitory computer-readable storage medium having embodied thereon a program executable by a processor to perform a method for scanning packet payload data, the method comprising:
   receiving a plurality of different packet sets from a plurality of different client application programs over one or more data communication connections, wherein at least one of the data communication connections transports packets in accordance with a transfer control protocol (TCP), and wherein each set corresponds to at least one of the data communication connections;
   identifying that at least one packet associated with a first packet set is received out-of-order, wherein the out-of-order packet is associated with a first client application and a first communication connection;
   tracking an association between a predetermined attack pattern, the first packet set, and the first communication connection;
   storing the at least one packet of the first packet set in a buffer before transmitting to a destination;
   processing one or more other data packets associated with one or more other packet sets;
   receiving another packet associated with the first packet set;
   identifying that the other packet precedes the out-of-order packet within the first packet set;
   scanning the second packet before scanning the out-of-order packet;
   identifying that the first packet set includes the attack pattern based on scanning of the second packet and the out-of-order packet and the tracked association between the attack pattern, the first packet set, and the first communication connection; and
   blocking the data packets associated with the first packet set based on the identification that the first packet set includes the attack pattern.

9. The non-transitory computer-readable storage medium of claim 8, wherein the program further comprises instructions executable to identifying that the first packet set includes the attack pattern after a plurality of different data packets associated with the first packet set have been received.

10. The non-transitory computer-readable storage medium of claim 8, wherein each of the data packets associated with the first packet set includes a sequence number.

11. The non-transitory computer-readable storage medium of claim 8, wherein each of the data packets associated with one of the other packet sets includes a sequence number.

12. The non-transitory computer-readable storage medium of claim 8, wherein the data packets associated with one of the other packet sets are transmitted over a different connection than the data packets associated with the first packet set.

13. The non-transitory computer-readable storage medium of claim 8, wherein a set of multiple attack patterns that includes the predetermined attack pattern is associated with a signature, and wherein scanning comprises scanning for the set of attack patterns associated with the signature.

14. The non-transitory computer-readable storage medium of claim 13, wherein scanning for the set of attack patterns associated with the signature comprises use of a pointer to point to a current pattern matching state that corresponds to the predetermined attack pattern.

15. An apparatus for scanning packet payload data, the apparatus comprising:
- a communication interface that receives a plurality of different packet sets from a plurality of different client application programs over one or more data communication connections, wherein at least one of the data communication connections transports packets in accordance with a transfer control protocol (TCP), and wherein each set corresponds to at least one of the data communication connections;
- a buffer memory; and
- a processor that executes instructions stored in memory, wherein execution of the instructions by the processor:
  - identifies that at least one packet associated with a first packet set is received out-of-order, wherein the out-of-order packet is associated with a first client application and a first communication connection,
  - tracks an association between a predetermined attack pattern, the first packet set, and the first communication connection,
  - stores the at least one packet of the first packet set in the buffer memory before transmitting to a destination,
  - processes one or more other data packets associated with one or more other packet sets,
  - identifies that another packet associated with the first packet set precedes the out-of-order packet within the first packet set,
  - scans the second packet before scanning the out-of-order packet,
  - identifies that the first packet set includes the attack pattern based on scanning of the second packet and the out-of-order packet and the tracked association between the attack pattern, the first packet set, and the first communication connection; and
  - blocks the data packets associated with the first packet set based on the identification that the first packet set includes the attack pattern.

16. The apparatus of claim 15, wherein a set of multiple attack patterns that includes the predetermined attack pattern is associated with a signature, and wherein the processor further scans for the set of attack patterns associated with the signature.

17. The apparatus of claim 15, wherein the processor scans for the set of attack patterns associated with the signature by using a pointer to point to a current pattern matching state that corresponds to the predetermined attack pattern.

* * * * *